United States Patent [19]

Preece et al.

[11] 4,117,793
[45] Oct. 3, 1978

[54] POLE CLAW MEMBER FOR A DYNAMO ELECTRIC MACHINE ROTOR

[75] Inventors: Kenneth Preece, Solihull; Walter Graham Cheary, Birmingham, both of England

[73] Assignee: Lucas Industries Limited, Birmingham, England

[21] Appl. No.: 779,661

[22] Filed: Mar. 21, 1977

[30] Foreign Application Priority Data

Apr. 7, 1976 [GB] United Kingdom ............... 14040/76

[51] Int. Cl.² ........................................... B21D 53/26
[52] U.S. Cl. ............................ 113/116 D; 113/116 V; 310/263; 29/598
[58] Field of Search ............. 29/415, 598; 113/116 D, 113/116 P, 116 V; 310/263

[56] References Cited

U.S. PATENT DOCUMENTS

| 2,795,715 | 6/1957 | Gilchrist | 310/263 |
| 3,129,505 | 4/1964 | Cox | 113/116 D |
| 3,573,519 | 4/1971 | Kumazawa | 310/263 |
| 3,601,876 | 8/1971 | Vogt | 113/116 D |

FOREIGN PATENT DOCUMENTS 1,525,281  9/1969  Fed. Rep. of Germany ............. 29/415

Primary Examiner—Lowell A. Larson
Attorney, Agent, or Firm—Ladas, Parry, Von Gehr, Goldsmith & Deschamps

[57] ABSTRACT

A method of manufacturing a pole claw member for a dynamo electric machine comprises in a first embodiment forming a serrated longitudinal edge in a ferrous strip and bending the serrated strip to form a cylinder with the serrations extending axially. The ends of the strip are then secured together by welding, rivetting or by a tang and aperture connection to produce a coronet form. The coronet form is then deformed in one or more, preferably three, die forming steps to produce the desired shape of claw and to define an annular base at the end of the cylinder.

In an alternative embodiment, the coronet form is produced by punching out portions of a previously formed tube and is then deformed as in the first embodiment.

16 Claims, 10 Drawing Figures

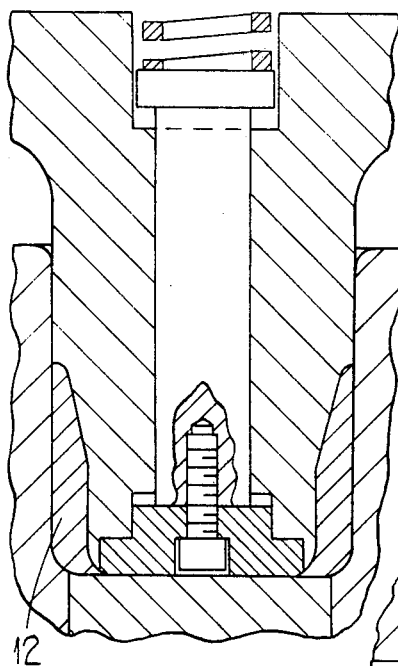
FIG.5.
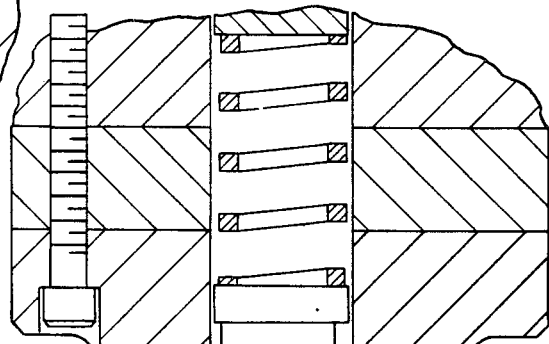
FIG.6.
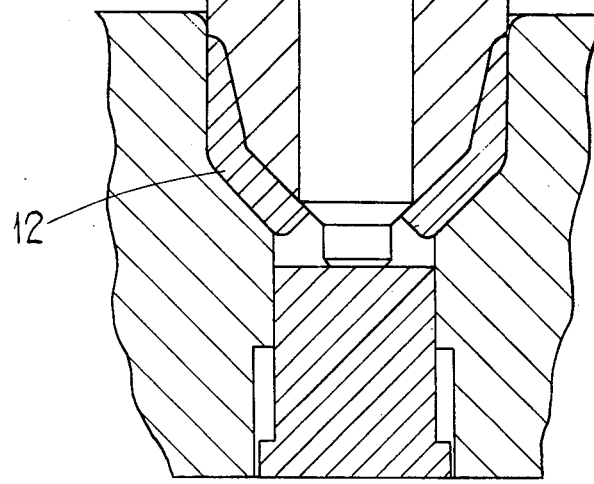

POLE CLAW MEMBER FOR A DYNAMO ELECTRIC MACHINE ROTOR

This invention relates to a method of manufacturing a pole claw member for a dynamo electric machine rotor, and to a pole claw member manufactured by the method.

A pole claw member for a dynamo electric machine rotor, of known form is generally cup-shaped having a flat annular base from the outer periphery of which a cylindrical wall is upstanding. The cylindrical wall is slotted, in an axial direction, so as to define a plurality of part cylindrical parallel claws. In use it is usual to position a pair of pole claw members on a common axis with a cylindrical core therebetween. The core is magnetically linked to the bases of the two claw members and the claws of the members overlie the core, the claws of each member extending towards the other member and the members being angularly orientated with respect to one another such that the claws of the two members are interdigitated. A rotor winding encircles the core beneath the interdigitated claw.

A method of manufacturing a pole claw member according to the invention includes forming a cylinder of ferrous material having one of its axial ends generally plain and the other of its axial ends serrated, the serrations extending axially of the cylinder and being equal in number to the number of claws of the member to be manufactured and subjecting the cylinder to a deforming operation, or sequence of deforming operations, to shape the serrations to the desired claw shape and to produce an annular base extending in a plane generally at right angles to the axis of the cylinder.

In one embodiment, the cylinder with serrations extending axially thereof is formed by bending an elongate ferrous strip having one of its long edges generally plain and its opposite long edge serrated into cylindrical form and then interconnecting the ends of the strip.

Preferably, the ends of said strip are interconnected by an operation separate from said deforming operation, or sequence of deforming operations.

Conveniently the ends of said strip are interconnected by welding or rivetting.

Alternatively, the ends of the strip are interconnected by introducing a tang on one end of the strip into a corresponding aperture in the opposite end of the strip.

Desirably, said tang and aperture are of mating dovetail form.

As an alternative to interconnecting the ends of the strip in a separate operation the interconnection is effected during the deforming operation or sequence of deforming operations.

Preferably the serrated strip is cut from a wider strip, the cutting producing the serrations, and the wider strip being of a width sufficient that a single cutting operation produces a pair of the serrated strips from the wider strip.

Conveniently, the cutting operation producing a pair of serrated strips from a single wider strip is a stamping process.

In another embodiment, the cylinder with serrations extending axially thereof is formed by producing the axial serrations in a previously formed tube.

The serrations are preferably produced by one or more die cutting or punching operations although they may be produced by laser beam, flame or saw cutting.

Preferably, the method includes the step of sizing the aperture of the annular base of the member.

Desirably, the sizing operation is performed at an appropriate stage during the deforming operation or sequence of deforming operations.

The invention further resides in a pole claw member, manufactured by the method specified in any one of the last preceding twelve paragraphs.

The invention still further resides in a dynamo electric machine rotor assembly incorporating a pair of pole claw members as specified in the preceding paragraph, and a cylindrical core the ends of the cylindrical core being a tight fit in the central apertures of the bases of said pair of claw members respectively, so as to be magnetically connected thereto, and the claws of the two members being interdigitated, there being a rotor winding encircling the intermediate region of the core beneath the interdigitated claws.

One example of the invention is illustrated in the accompanying drawing, wherein.

Figure 3:
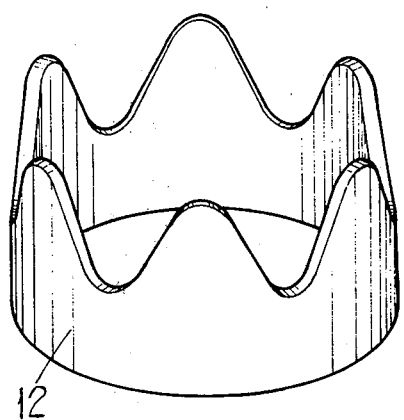
Figure 4:
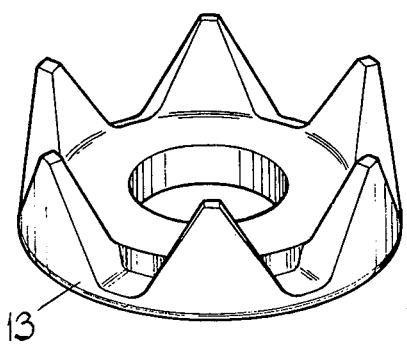
Figure 7:
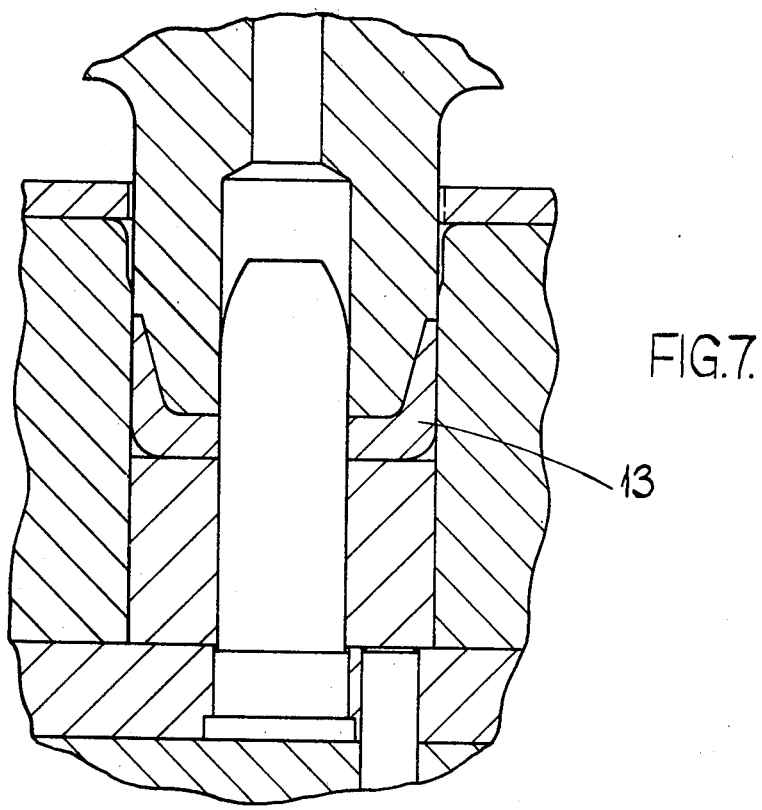
Figure 8:
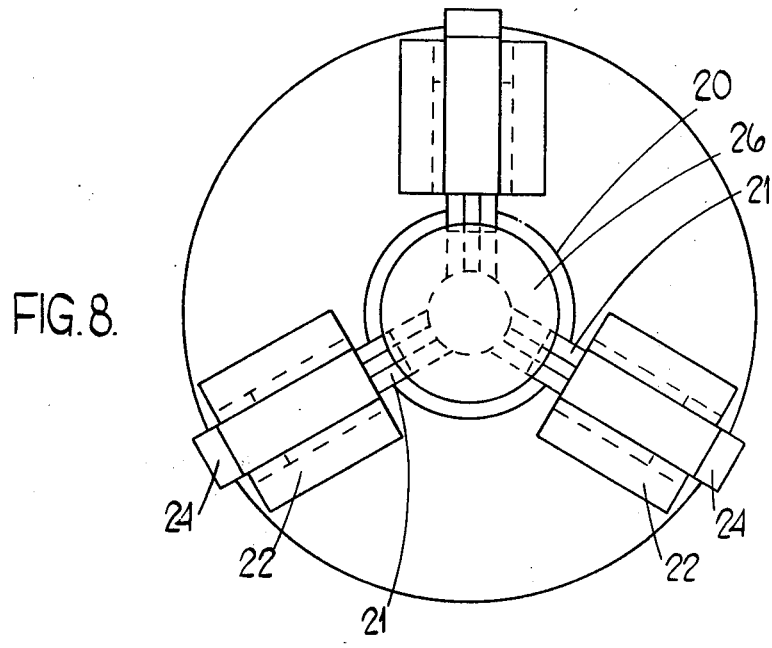
Figure 9:
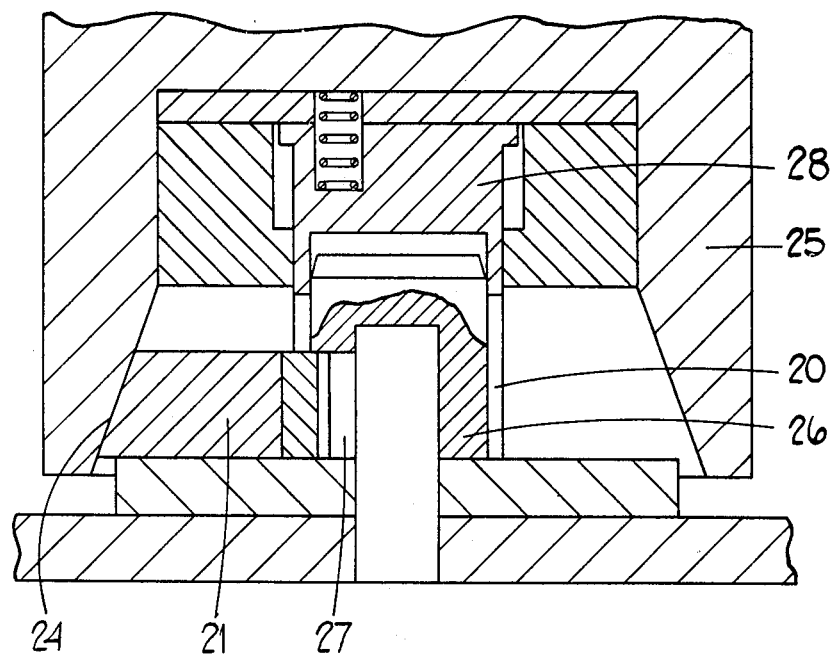
Figure 10:
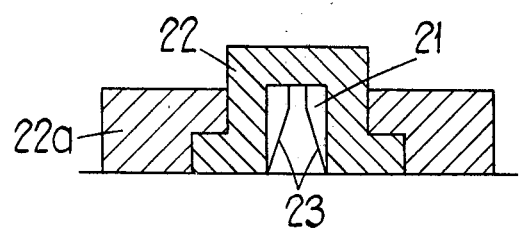

FIG. 3 is a perspective view of an intermediate stage in the manufacture of the member, FIG. 4 is a perspective view of a substantially finished pole claw member, FIGS. 5, 6 and 7 are diagrammatic sectional views illustrating the deforming operation which produces the claw member shown in FIG. 4, FIG. 8 is schematic plan view of a die punch machine, with parts removed for clarity, producing a serrated cylinder in the manufacture of a pole claw member according to an alternative embodiment of the method of the invention, FIG. 9 is a schematic, sectional side elevation of the punch of FIG. 8, and FIG. 10 is a view showing the shape of one of the tools of the punch of FIGS. 8 and 9.

Figure 1:
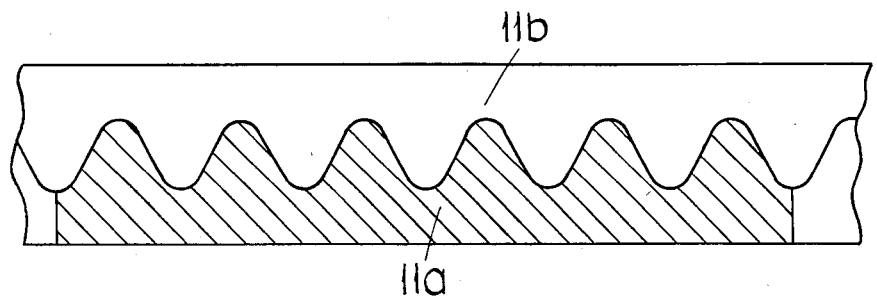
FIG. 1 is a diagrammatic plan view indicating how a serrated strip is produced in the manufacture of a pole claw member according to one embodiment of the method of the invention.
Figure 2:
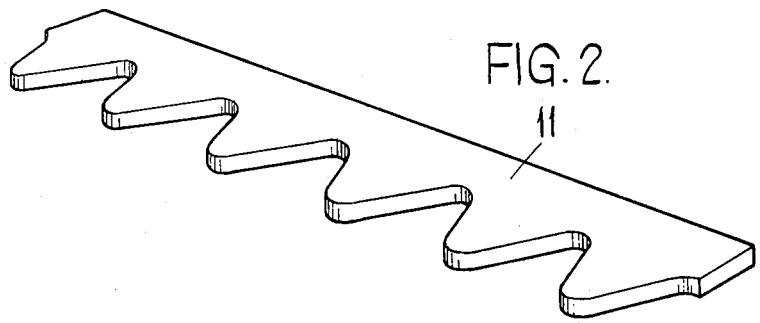
FIG. 2 is a diagrammatic perspective view of a serrated strip produced as indicated in FIG. 1.

The pole claw member shown in FIG. 4 is manufactured from a ferrous strip 11 which is best shown in FIG. 2. FIG. 1 shows a pair of similar ferrous strips 11a, 11b being produced simultaneously from a wider strip by a cutting operation which produces the serrated edges of the two strips 11a, 11b. The cutting operation is preferably a stamping or cropping operation and in addition to producing the serrated edges of the basic strips there is a lateral cutting operation which defines the ends of the strips. It will be recognised that by choosing the correct width of strip substantially no wastage of material occurs.

The strip 11 is then bent around a cylindrical former to produce the coronet form 12 shown in FIG. 3. The free ends of the strip 11 are preferably interconnected by butt or lap welding, but of course could be interconnected by other methods, for example rivetting, or by providing one end of the strip with a tang which engages in a corresponding aperture in the opposite end of the strip. Conveniently the tang and aperture could be of dove-tail shape.

It will be understood that the strip 11 has a number of serrations equal to the number of claws on the required pole claw member. Thus the coronet form 12 has a number of upstanding projections equal to the number of claws to be produced. Furthermore the root to apex dimension of the serrations is of the order of the root to apex dimension of the required pole claws, it being understood that the drawings are not each to the same scale.

The coronet form 12 is then subjected to a deforming operation in a press, to produce the pole claw member shown in FIG. 4. It is anticipated that it will be possible to design press tools which produce the pole claw member 13 shown in FIG. 4 from the coronet form 12 shown in FIG. 3, in two or even a single press stroke. However, experiments to date have proved more successful using a three stage approach where three deforming operations are performed in sequence using appropriate tools in each operation of the sequence.

In the three stage deformation there are thus three cold forging operations performed in sequence. Initially (FIG. 5) the coronet form 12 is introduced into a fixed die carried by the fixed platen of the cold forging press, the die being generally in the form of a plain cylinder, and coronet form 12 being inserted therein with the serrations extending towards the movable platen of the press. The press is operated and a punch carried by the movable platen strikes the coronet form and shapes the serrations to the required claw shape. It will be understood therefore, that it is necessary to locate the coronet form 12 angularly with respect to the punch in order that the serrations correspond with the claw forms on the punch.

The partly worked coronet form is then removed from the first die and inserted into a second die, the lower end of which tapers inwardly. The corresponding punch is shaped to preserve the claw shaping produced in the previous operation and also to permit the lower end of the coronet form to collapse inwardly, as it is driven against the inwardly tapering part of the die. Thus the second stage of the operation initiates the formation of the annular base of the claw member.

Finally the partly formed claw member is introduced into a third die which has a flat base with a mandrel extending upwardly therefrom. The corresponding punch is once again shaped to preserve the claw shaping, and as the punch is driven into the die the partially formed base of the claw member is completely formed against the flat base of the die, and around the mandrel.

While it is preferred to interconnect the ends of the strip 11 when forming the coronet form 12, that is to say as an operation separate from the deforming operation, it is believed that appropriate tool design will enable the actual interconnection of the ends of the strip to be achieved during the deforming operation or sequence of operations. Thus the strip 11 will be bent to the coronet form 12 but will not have its ends interconnected prior to the coronet form 12 being introduced into the die of the cold forging press, and weld will be achieved between the ends of the strip during the cold forging operation or sequence of operations which results in the claw member 13 shown in FIG. 4.

In a conventional rotor for a dynamo electric machine, there is a pair of claw members and a central cylindrical core, the claw members having relatively small diameter apertures in their bases, and the axial ends of the core abutting the faces of the claw members respectively. Thus, the magnetic interconnection of the core and the claw members is dependent upon the force with which the bases of the claw members are urged against the core. However, the claw members produced in the above described manner afford the possibility of a different manner of rotor construction. The central aperture of the base member of each claw member is relatively large, and can be sized to accept the appropriate axial end of a rotor core, as a drive fit. Thus a pair of claw members are press fitted onto opposite axial ends of a core, with their claws extending towards one another and being angularly arranged so as to be interdigitated. The tight fit which can thus be achieved between the core and the bases of the claw members ensures that there is a good magnetic connection between them. It will be understood that a rotor winding wound on a cylindrical former is positioned on the core prior to press fitting the claw members onto the core.

Referring now to FIGS. 8 to 10, in an alternative method a modified coronet form is produced from a short length of ferrous tube 20 by mounting the tube 20 in an indexable die punch having in this embodiment, three tools 21 mounted in holders 22 slidable relative to fixed guides 22a. The tools 21 are formed cutting edges 23 which taper mutually inwardly from the bottom and then extend mutually parallel (see FIG. 10). Each tool 21 is slidable radially with its holder 22 which has a tapered rear surface 24 (FIGS. 8 and 9). A vertically slidable taper ring 25 as it descends engages the surface 24 of the holder 22 to urge them inwardly and so effect a cutting operation on the tube 20. During the cutting operation, the tube 20 is mounted on a mandrel 26 having recesses 27 therein corresponding to the shape of the cutting tips of the tools 21.

A spring biassed pressure pad 28 serves to retain the tube 20 in position as the taper ring 25 descends. The above operation produces three cut-outs in the tube 20, each cut-out having a shape which corresponds to the shape of the tip of the respective tool 21. Following this, the tube 20 is indexed through 60° and the cutting operation is repeated once more so that the tube 20 has six of the cut-outs therein whereby there is produced a coronet form having six upstanding projections thereon. Thereafter, the coronet form is subjected to the same series of operations as described hereinabove to which the coronet form 12 was subjected.

It is desired, instead of using a three tool punch, a 1, 2 or 6 tool punch could have been used to produce the six projection coronet form. In the case of a 6 tool punch, no indexing would be necessary. The provision of the cut-out in the form described assists in the subsequent deforming operations to which the coronet form is subjected.

We claim:

1. A method of manufacturing a pole claw member including the steps of:
   (a) bending an elongate strip of ferrous material, having one of its long edges generally plain and its opposite long edge serrated, to form a cylinder, whereby one axial end of the cylinder is generally plain and the other axial end of the cylinder is serrated, with the serrations extending axially of the cylinder and being equal in number to the number of claws of the member to be manufactured;
   (b) interconnecting the ends of the strip; and
   (c) utilizing mating dies to deform the generally plain end of the cylinder to produce an annular base extending in a plane generally at right angles to the axis of the cylinder and to shape the serrations to the desired claw shape.

2. A method as claimed in claim 1, including the step of sizing the aperture of the annular base of the member.

3. A method as claimed in claim 2, wherein the sizing operation is performed at an appropriate stage during the deforming operation.

4. A method as claimed in claim 1, wherein the ends of said strip are interconnected by an operation separate from said deforming operation, or sequence of deforming operations.

5. A method as claimed in claim 4, wherein the ends of said strip are interconnected by welding or rivetting.

6. A method as claimed in claim 4, wherein the ends of the strip are interconnected by introducing a tang on one end of the strip into a corresponding aperture in the opposite end of the strip.

7. A method as claimed in claim 6, wherein said tang and aperture are of mating dove-tail form.

8. A method as claimed in claim 1, wherein the serrated strip is cut from a wider strip, the cutting producing the serrations, and the wider strip being of a width sufficient that a single cutting operation produces a pair of the serrated strips from the wider strip.

9. A method as claimed in claim 8, wherein the cutting operation producing a pair of serrated strips from a single wider strip is a stamping process.

10. A pole claw member, manufactured by the method as claimed in claim 1.

11. A method of manufacturing a pole claw member including the steps of:

(a) forming a cylinder of ferrous material, the cylinder having first and second axial ends of which the first end is generally plain;

(b) producing serrations in the second axial end of the cylinder, the serrations extending axially of the cylinder and being equal in number to the number of claws of the member to be manufactured; and (c) utilizing mating dies to deform said first axial end of the cylinder to produce an annular base extending in a plane generally at right angles to the axis of the cylinder and to shape the serrations to the desired claw shape.

12. A method as claimed in claim 11, wherein the serrations are defined by cut-outs whose sides taper mutually inwardly from said second end of the cylinder towards said first end and then extend mutually parallel.

13. A method as claimed in claim 12, wherein the serrations are produced by one more die cutting or punching operations.

14. A method as claimed in claim 11, including the step of sizing the aperture of the annular base of the member.

15. A method as claimed in claim 14, wherein the sizing operation is performed at an appropriate stage during the deforming operation or sequence of deforming operations.

16. A pole claw member, manufactured by the method as claimed in claim 11.

* * * * *